2 Sheets--Sheet 1.
T. W. BAXTER.
Method of Setting Black Diamonds.
No. 134,968. Patented Jan. 21, 1873.
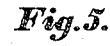
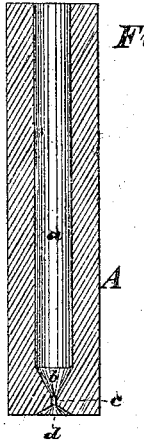
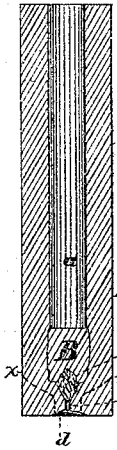
AM. PHOTO-LITHOGRAPHIC CO. N.Y. (OSBORNE'S PROCESS)

2 Sheets--Sheet 2.
T. W. BAXTER
Method of Setting Black Diamonds.
No. 134,968. Patented Jan. 21, 1873.
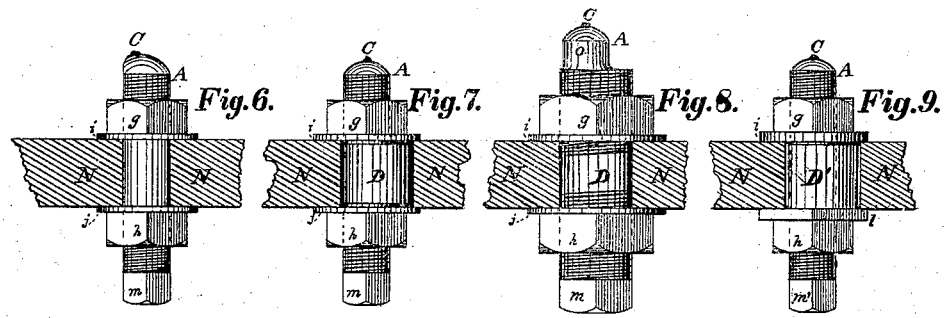
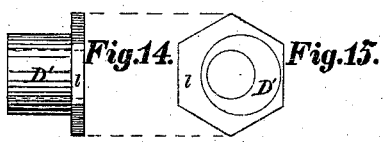
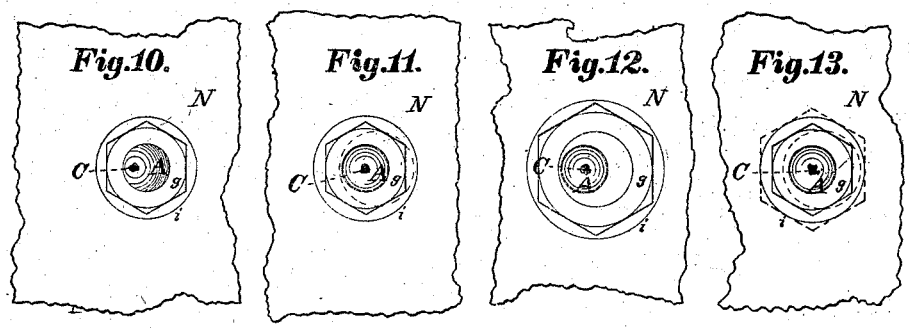
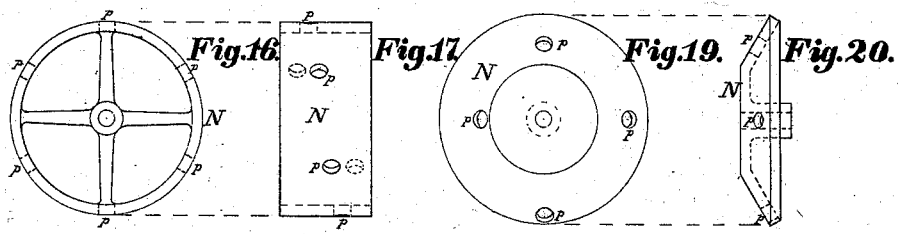

UNITED STATES PATENT OFFICE.

THOMAS W. BAXTER, OF CHICAGO, ILLINOIS.

IMPROVEMENT IN METHODS OF SETTING BLACK DIAMONDS.

Specification forming part of Letters Patent No. 134,968, dated January 21, 1873.

*To all whom it may concern:*

Be it known that I, THOMAS W. BAXTER, of Chicago, in the county of Cook and State of Illinois, have invented a new and Improved Method of Setting Black Diamond or Carbon or other equivalent Points in Holders, and means for their adjustment for mechanical purposes, of which the following is a specification:

Heretofore, in using the material variously known as carbon, boart, black diamond, or diamond, great difficulty has been experienced in so setting, or bedding, or otherwise securing the stones in the holders or stocks in which they are held as to prevent their working loose and coming out. In the means generally employed for that purpose the diamond is liable to injury either from being heated in presence of the air, as when it is brazed in; or from being cracked or broken by the hammer, as when a cavity is made in the holder and the metal "peaned" down around the stone. When the stones are brazed in or bedded in hard solder in a molten condition, though a close contact may be obtained, yet this material is so soft that the stone readily forces it aside and thus becomes loose, while the bedding formed by carving out a cavity in steel, and then peaning down the steel around the stone is imperfect because it is not practicable to insure complete contact by this means. The prominent parts only of the stone will be embedded, and as those are usually sharp points they soon cut their way into the sides of the bed and thus loosen the stone. Thus, from the imperfect manner in which they are generally secured, many stones are loosened, lost out, and frequently broken by being struck by the other stones remaining in the stock, whence results considerable loss, not only of the stones themselves, but also from the stoppage of the machines or tools in which they are employed.

When two or more carbon-points are used in the same stock, and no means are provided for the adjustment of the position of the cutting-points with relation to each other, and with relation to the cut made by all the stones in the stock taken together, it has been very difficult, if not impossible, to so set or bed the said carbon-points that each will do its share of the work, and all together shall produce the desired surface or profile on the stone or other material operated upon. Another defect in the devices heretofore used for holding and for adjusting the said cutting-points is found in the absence of any means whereby the stone may be turned on its own axis without materially changing its position with relation to other stones in the same stock. The object of such an adjustment is to bring that face or profile of the cutting-point which will perform the greatest amount of work, or which is best suited to produce the quality of work desired, in a position at right angles to the line of motion, so that such desired face or profile shall act as the cutting edge or face of the cutter.

The object of my invention is to remedy these defects, and to provide, first, a means or method for setting or embedding the carbon or other equivalent tools or points which shall leave them entirely uninjured by the process of setting, and hold them so securely that there will be no reasonable probability of their being loosened or thrown out from the holders while at work; second, simple, cheap, and effective means for adjusting the said points, when two or more are used in the same stock, so that the individual cuts of the several stones may be made to adjoin or overlap each other, or be made to assume any other position with relation to each other that may be desired, while at the same time they may be made to cut to a greater or less relative depth in the material operated upon by means of a separate and independent adjustment; third, suitable means whereby the cutting-point may, without changing its position with relation to other points in the same stock, be turned on its own axis so as to bring either of its faces to operate on the material to be cut. My invention consists in bedding or setting the carbon or equivalent point or tool, by pressure, into a metallic holder, which holder I prefer to make of steel well annealed. It consists further in setting the carbon-point eccentric to a circular opening in the stock, in which opening the holder is placed by suitable mechanical means or devices, whereby I am enabled to adjust the cutting-point with relation to its lateral position in the aggregate cut of all the stones in the stock. It consists further in the combination, with the holder and stock, of an independent sleeve or bushing set in the opening in the stock, and having an eccentric circular opening through it in which the holder is placed, whereby I am enabled to adjust the diamond-point laterally by turning the said sleeve in the stock, and at the same time present either side of the cutting-point of the carbon to the material to be operated upon by turning the holder in the eccentric sleeve.

In setting or embedding the carbon or other point by the method herein set forth, I prefer to harden the steel immediately around it, first taking care to exclude the air from the stone when the steel is heated for hardening, though the hardening of the steel may be omitted. After hardening it I grind away that portion of the holder which covers the cutting-point or end of the stone. The greater part of the stone thus remains bedded in and entirely surrounded by a compact mass of hardened steel, touching or clasping the whole surface of the embedded portion, and giving the greatest possible amount of bearing-surface to resist the loosening of the stone in its bed. Great care should be exercised to avoid giving the stone or the inclosing steel a blow or shock, such, for instance, as that produced by a hammer, as thereby the stone may be easily fractured. The pressure applied should be steady, but gradually increasing until the desired result is obtained.

While preferring the use of steel for the holder I am yet aware that soft tough iron, brass, or bronze may be employed, and very good results be thereby obtained; and that after embedding the stone in iron the iron may be case-hardened around it. The body of the holder may be of one kind of metal, as steel, for example, and the backing or plug behind the stone may be of a different kind of metal, as soft brass, or other composition. I do not, therefore, desire to be understood as restricting myself to the use of steel alone as the material of which to make the holder; since whatever material is employed the use of the method or mode of embedding the points by pressure, herein described, will give better results than any of those now in use.

The form of the holder in which the carbon is embedded, will, of course, depend on the use to which the tool is to be applied and the machine or apparatus in which it is to be used.

The accompanying drawings illustrate my improved mode or method of setting or embedding the carbon point or tool, and my improved means for obtaining lateral adjustment, and the adjustment of the point as to the side of it which is to do the cutting, as well as the adjustment of the relative depth cut by each point in a holder, which is of about the proper form for use in the stone-dressing machine patented by T. W. BAXTER, October 21, 1871.

As the whole substance of my invention is embodied in the devices shown, it will, of course, be unnecessary to illustrate other forms, which will readily suggest themselves to those who use carbon or equivalent cutters for mechanical purposes.

In the drawing, Figure 1 represents in section, through its axis, the body or principal part of the holder prepared to receive the diamond or carbon. Fig. 2 represents the stone itself. Fig. 3 is a longitudinal section, through its axis, of a soft-steel plug, which I insert in the holder back of the diamond, and which forms part of its bed. Fig. 4 is a similar section of the holder after the stone has been embedded by means of pressure. Fig. 5 is a side elevation of the holder after the steel around the carbon has been hardened and the end of the holder ground away, so as to expose the working or cutting end of the stone. Fig. 6 is a side elevation of a holder furnished with adjusting-nuts to regulate the depth of the cut of the point, and having the said point set eccentric to the axis on which the holder turns, so that, by turning the latter around, the lateral position of the cut made by the point with relation to the cuts made by the other points in the stock is effected. A portion of the stock is also shown in section, on a plane which passes through the axis of the holder. Fig. 7 is a similar view of a modified form of the same, in which the carbon is set concentric with the main part of the holder, which latter has a short eccentric portion formed on it which fits the opening in the stock. The length of this eccentric portion is considerably less than the thickness of that portion of the stock through which the holder passes, so as to allow the motion necessary for adjustment in line with the axis of the holder. Fig. 8 is a similar view of another modification of the same, in which the eccentric portion projects through the plate of the stock each way far enough to receive the adjusting-nuts and allow the necessary adjustment. The object in carrying out the portion o, in which the carbon-point is set, is to facilitate its setting by the method herein set forth. Fig. 9 is a similar view of a holder with an independent adjusting-eccentric set in a circular opening in the stock, through which eccentric the said holder passes, thereby providing not only for an adjustment of the point as to the relative depth it is to cut, and for a lateral adjustment as well, but also for an adjustment of the point by turning it around on its own axis so as to bring either of its faces, as may be desired, to a position at right angles to the line of motion, so that such face shall act as the cutting-edge of the said point or tool. Fig. 10 is a top view of Fig. 6. Fig. 11 is a similar view of Fig. 7. Fig. 12 is a similar view of Fig. 8. Fig. 13 is a similar view of Fig. 9. Figs. 14 and 15 are, respectively, side and end views of the eccentric sleeve or plug, shown in Figs. 9 and 13. It will be observed that it has a hexagonal head, for convenience in turning it to adjust the cutting-point laterally. Fig. 16 is a side elevation, and Fig. 17 a face view of a rotating stock, in which the circular openings for receiving the eccentric portions of the holders are shown. In this form the operation of the cutters is similar to that of the cutters in a Woodworth wood-planing machine. Figs. 19 and 20 are similar views of a rotating stock, showing the openings for the holders, the carbon-points of which act, when taken together, in a similar manner to that of the cutters in a Daniels wood-planer.

In Figs. 1 to 5, inclusive, the principal part A of the holder has a central hole, $a$, made nearly through it, large enough in diameter to freely admit the stone which it is intended to bed. The inner end of the hole is made conical in form, as shown at $b$, to facilitate the setting of the stone. A small hole, $c$, is provided for the escape of the air as the steel closes around the diamond, and a conical depression, $d$, is made in the piece A, to allow the steel to give way slightly as the stone is pressed in, which facilitates the formation of the bed. The part B has a conical depression, $e$, in the end of it, which comes against the stone of less depth than $b$, but for a similar purpose, and a hole, $f$, for the escape of the air.

The stone being placed in the bottom of the hole $a$, with that portion of it which it is desired shall be the working point or part against the hole $c$, and the plug or part B placed over it with the conical cavity $e$ next to the diamond, a hard-steel punch is inserted in the hole $a$, and pressed down by any suitable device, as, for example, a powerful screw, to which a slow and steady motion is imparted. This operation causes the parts to assume the form shown in Fig. 4; but the part B is so snugly swaged or swelled out and embedded in the part A as to appear to form but one continuous piece with it. The stone being thus embedded or set in the steel, the holder is put in a chuck and the steel turned away to the dotted lines $x x$, and the hole $c$ stopped up air-tight with a steel or copper plug, after which the end of the holder containing the diamond and the part surrounding and covering the working or cutting end of the diamond is ground away, as seen in Fig. 5. Previous to hardening the holder it may be furnished with adjusting-threads and nuts, or otherwise prepared for the position it is to occupy, as may be desired.

In Figs. 6 and 10, the diamond C is set eccentric to that portion of the holder A immediately adjacent to its bed, as well as to that portion which fits in the plate of the stock. This formation is unfavorable to the use of my improved method of setting the carbon herein described. In Figs. 7, 8, 11, and 12, however, a special eccentric portion, D, is formed on the holder A, thus allowing the diamond C to occupy a central position in the metal immediately adjacent to it. In all these figures, however, the lateral adjustment is obtained by turning the holder A, and with it the diamond C, by means of a wrench applied at $m$, which is made square or hexagonal for that purpose.

In Figs. 9, 13, 14, and 15, the construction shown enables me to adjust the cutting-point, as to the side, profile, or face of the said point to be presented to the material to be operated upon, by turning the holder A on its own axis by a wrench applied at $m'$; as to its lateral position, by turning the eccentric D' with a wrench applied at $l$; and as to the relative depth it is to cut, by the nuts $g$ and $h$. The latter adjustment is common to all the forms shown; in each case the nuts being fitted upon the holder A, and having washers $i$ and $j$ interposed between them and the plate N of the stock, except where the hexagonal head $l$ of the eccentric D' takes the place of the washer $j$.

It is evident that either of the four forms of adjustment by means of eccentrics may be employed by inserting the holders with the eccentrics in the openings $p$ in the plates N of the stocks, and securing them in place by the nuts $g$ and $h$.

Having thus fully described my invention, I claim—

1. The mode or method of setting or embedding carbon, boart, black-diamond, or equivalent points or tools in holders for mechanical purposes, substantially as hereinabove set forth.

2. The carbon, boart, black-diamond, or equivalent point set eccentric to that part of the stock in which the holder is secured, substantially as described, so that by turning the said holder in the stock the position of the cutting-point with relation to other cutting-points in the same stock may be varied, substantially as set forth.

3. In combination with the stock and the holder in which the black-diamond, boart, carbon, or other equivalent tool or point is embedded or held, an eccentric sleeve or equivalent therefor, substantially as described, so that the holder may be rotated independently of the said sleeve, for the purpose of adjusting the said tool or point to bring either one of its sides or faces to operate on the material to be cut without changing its position with relation to the other points in the same stock, while, at the same time, by turning the said sleeve the point may be adjusted laterally, if so desired, substantially as described.

T. W. BAXTER.

Witnesses:
WM. H. BISHOP,
A. J. DELACY.